United States Patent
Hao et al.

(10) Patent No.: US 11,372,274 B2
(45) Date of Patent: Jun. 28, 2022

(54) DISPLAY DEVICE AND FRAME FOR THE DISPLAY DEVICE

(71) Applicants: K-Tronics (Suzhou) Technology Co., Ltd., Suzhou (CN); BOE TECHNOLOGY GROUP CO., LTD., Beijing (CN)

(72) Inventors: Guangning Hao, Beijing (CN); Tao Ni, Beijing (CN); Yaojun Sun, Beijing (CN)

(73) Assignees: K-Tronics (Suzhou) Technology Co., Ltd., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 149 days.

(21) Appl. No.: 16/766,852

(22) PCT Filed: Jun. 26, 2019

(86) PCT No.: PCT/CN2019/093076
§ 371 (c)(1),
(2) Date: May 26, 2020

(87) PCT Pub. No.: WO2020/258087
PCT Pub. Date: Dec. 30, 2020

(65) Prior Publication Data
US 2021/0405413 A1     Dec. 30, 2021

(51) Int. Cl.
*G02F 1/1333*     (2006.01)
*G02F 1/13357*    (2006.01)

(52) U.S. Cl.
CPC .... *G02F 1/133317* (2021.01); *G02F 1/13332* (2021.01); *G02F 1/133322* (2021.01); *G02F 1/133605* (2013.01); *G02F 2201/46* (2013.01)

(58) Field of Classification Search
CPC ........... G02F 2201/46; G02F 2201/465; G02F 1/133322; G02F 1/133608; G02F 1/13332; G02F 1/133317; G02F 1/133308
See application file for complete search history.

(56) References Cited

U.S. PATENT DOCUMENTS 8,662,693 B2   3/2014   Huang
8,902,376 B2  12/2014   Huang
(Continued)

FOREIGN PATENT DOCUMENTS

CN   101158772 A   4/2008
CN   102175001 A   9/2011
(Continued)

OTHER PUBLICATIONS

Written Opinion dated Mar. 12, 2020 for PCT Patent Application No. PCT/CN2019/093076.

*Primary Examiner* — Jia X Pan
(74) *Attorney, Agent, or Firm* — Thomas | Horstemeyer LLP

(57) ABSTRACT

The present disclosure provides a display device and a frame for the display device, which relate to display technologies. The display device includes an optical film layer, a frame and a positioning member. The optical film layer is provided with a positioning hole. The frame is provided with a first supporting surface for supporting the optical film layer and a first positioning groove opened on the first supporting surface. The positioning member penetrates through the positioning hole and is fixed to the first positioning groove.

19 Claims, 5 Drawing Sheets

(56) References Cited

U.S. PATENT DOCUMENTS

| | | | | |
|---|---|---|---|---|
| 2009/0033827 A1* | 2/2009 | Chen | ............ | G02F 1/1335 |
| | | | | 349/58 |
| 2010/0302717 A1* | 12/2010 | Oh | ............ | G02F 1/133308 |
| | | | | 361/679.01 |
| 2011/0007230 A1* | 1/2011 | Yamamoto | ........ | G02F 1/133604 |
| | | | | 348/794 |
| 2012/0170250 A1* | 7/2012 | Huang | ............ | G02F 1/133608 |
| | | | | 362/97.1 |
| 2013/0003339 A1* | 1/2013 | Chen | ............ | A47B 81/06 |
| | | | | 361/807 |
| 2013/0222735 A1* | 8/2013 | Huang | ............ | G02F 1/133608 |
| | | | | 349/64 |
| 2017/0123259 A1* | 5/2017 | Kim | ............ | G02F 1/133308 |
| 2020/0209687 A1* | 7/2020 | Yan | ............ | G02F 1/133606 |

FOREIGN PATENT DOCUMENTS

| | | | |
|---|---|---|---|
| CN | 102661553 A | | 9/2012 |
| CN | 103676275 A | | 3/2014 |
| CN | 103676275 B | | 4/2016 |
| KR | 20160064321 A | * | 6/2016 |
| KR | 20160064321 A | | 6/2016 |
| KR | 101677810 B1 | | 11/2016 |

\* cited by examiner

DISPLAY DEVICE AND FRAME FOR THE DISPLAY DEVICE

CROSS-REFERENCE TO RELATED APPLICATION

This application is a 35 U.S.C. § 371 national phase application based on International Application No. PCT/CN2019/093076, filed Jun. 26, 2019, where the entire contents of which re incorporated by reference in their entirety herein.

TECHNICAL FIELD

The present disclosure relates to display technologies and, in particular, to a display device and a frame for a display device.

BACKGROUND

At present, in narrow-bezel or bezel-less liquid crystal modules, space for positioning an optical film layer is getting increasingly smaller. For large-size liquid crystal modules, the optical film layer may be hooked with a lug structure to meet the structural and reliability requirements. In the related art, the optical film layer may be fixed on an aluminum frame by glue. However, this method is difficult to operate, and the fixing may not meet the reliability requirements.

It should be noted that the information disclosed in the Background section above is only for enhancing the understanding of the background of the present disclosure and thus, may include information that does not constitute prior art known to those of ordinary skill in the art.

SUMMARY

According to a first aspect of the present disclosure, a display device is provided, including:
an optical film layer provided with a positioning hole;
a frame provided with a first supporting surface for supporting the optical film layer and a first positioning groove opened on the first supporting surface; and
a positioning member penetrating through the positioning hole and fixed to the first positioning groove.

In an exemplary embodiment of the present disclosure, the display device further includes a liquid crystal panel; the frame is further provided with a second supporting surface for supporting the liquid crystal panel; and
the positioning member includes a first positioning portion fixed in the first positioning groove and a connecting portion connected to the first positioning portion, and the connecting portion is located between the first supporting surface and the second supporting surface.

In an exemplary embodiment of the present disclosure, the frame includes:
a side plate having an inner side facing the optical film layer;
a second supporting portion provided on the inner side, and provided with the second supporting surface; and
a first supporting portion provided on a side of the second supporting portion away from the side plate, and provided with the first supporting surface and the first positioning groove.

In an exemplary embodiment of the present disclosure, the frame is further provided with a second positioning groove, and the second positioning groove is provided between the first positioning groove and the side plate.

In an exemplary embodiment of the present disclosure, the positioning member further includes a second positioning portion, and the second positioning portion and the first positioning portion are connected by the connecting portion, where the connecting portion is an elastic structure;
the first positioning portion is clamped into the first positioning groove, and the second positioning portion is clamped into the second positioning groove.

In an exemplary embodiment of the present disclosure, the first positioning groove is provided with a first engaging cavity extending in a direction away from the second positioning groove; the second positioning groove is provided with a second engaging cavity extending in a direction away from the first positioning groove.

In an exemplary embodiment of the present disclosure, the first positioning portion is provided with a first protruding portion protruding in a direction away from the second positioning portion, and the first protruding portion is accommodated in the first engaging cavity;
the second positioning portion is provided with a second protruding portion protruding in a direction away from the first positioning portion, and the second protruding portion is accommodated in the second engaging cavity.

In an exemplary embodiment of the present disclosure, a surface of the second positioning portion close to the side plate is in contact connection with a surface of the second positioning groove close to the side plate.

In an exemplary embodiment of the present disclosure, a side of the first supporting portion away from the side plate is provided with a third supporting surface; in a direction away from the side plate, the third supporting surface extends in a direction away from the first supporting surface;
the optical film layer includes a reflective sheet, and the reflective sheet includes an end and an inclined portion; the end of the reflective sheet is supported on the first supporting surface, and the inclined portion of the reflective sheet is supported on the third supporting surface.

In an exemplary embodiment of the present disclosure, the frame includes positioning sections and supporting sections spaced apart along an extending direction.

In any of the positioning sections, the second supporting portion is provided with a first pocket notch opened on the second supporting surface; the first pocket notch is also opened on a side of the second supporting portion away from the side plate, and the first pocket notch has a bottom surface flush with the first supporting surface.

In an exemplary embodiment of the present disclosure, in any one of the positioning sections, the second supporting portion is further provided with a second pocket notch opened on the second supporting surface, the second pocket notch is located between the first pocket notch and the side plate; the second pocket notch is connected to the first pocket notch, and the second pocket notch has a bottom surface away from the second supporting surface.

The second positioning groove is provided on the second supporting portion, and a groove opening of the second positioning groove is located at the bottom surface of the second pocket notch.

In an exemplary embodiment of the present disclosure, along the extending direction of the frame, the second positioning groove extends through all the supporting sections.

In an exemplary embodiment of the present disclosure, the frame is further provided with a weight-reducing cavity, and an extension direction of the weight-reducing cavity is the same as the extension direction of the frame, and the weight-reducing cavity is in communication with the second positioning groove.

In an exemplary embodiment of the present disclosure, along the extending direction of the frame, the first positioning groove extends through the frame.

According to a second aspect of the present disclosure, a frame of a display device is provided, including:

a side plate having an inner side facing an optical film layer;

a second supporting portion provided on the inner side, and provided with a second supporting surface for supporting a liquid crystal panel; and a first supporting portion provided on a side of the second supporting portion away from the side plate, and provided with a first supporting surface for supporting the optical film layer; the first supporting portion is further provided with a first positioning groove opened on the first supporting surface.

In an exemplary embodiment of the present disclosure, the frame includes positioning sections and supporting sections spaced apart along an extending direction;

in any of the positioning sections, the second supporting portion is provided with a first pocket notch opened on the second supporting surface; the first pocket notch is also opened on a side of the second supporting portion away from the side plate, and the first pocket notch has a bottom surface flush with the first supporting surface;

in any one of the positioning sections, the second supporting portion is further provided with a second pocket notch opened on the second supporting surface, the second pocket notch is located between the first pocket notch and the side plate; the second pocket notch is connected to the first pocket notch, and the second pocket notch has a bottom surface away from the second supporting surface; and the second supporting portion is provided with a second positioning groove, and a groove opening of the second positioning groove is located at a bottom surface of the second pocket notch; along the extending direction of the frame, the second positioning groove extends through all the supporting sections.

BRIEF DESCRIPTION OF THE DRAWINGS

The above and other features and advantages of the present disclosure will become more apparent from the following descriptions with reference to drawings.

DETAILED DESCRIPTION

Figure 1:
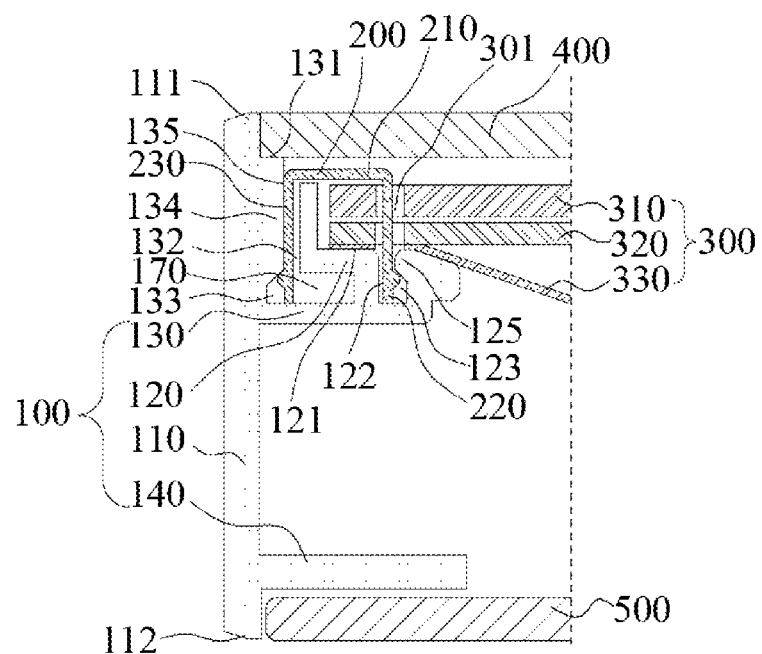
FIG. 1 is a schematic cross-sectional structure diagram of a display device in a positioning section according to an embodiment of the present disclosure.

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The described features, structures, or characteristics in one or more embodiments may be combined in any suitable manner. In the following description, many specific details are provided to give a full understanding of the embodiments of the present disclosure.

In the drawings, regions and layer thicknesses may be exaggerated for clarity. The same reference numerals in the drawings denote the same or similar parts, and the repeated description thereof will be omitted.

When a structure is "on" another structure, it may mean that a structure is integrally formed on another structure, or that a structure is "directly" disposed on another structure, or that a structure is "indirectly" disposed on another structure through other structures. The terms "first", "second", and "third" etc. are used to distinguish different objects, and are not intended to limit the number of objects.

Reference numbers of main elements in the drawings include: 100, frame; 110, side plate; 111, first end; 112, second end; 120, first supporting portion; 121, first supporting surface; 122, first positioning groove; 123, first engaging cavity; 124, third supporting surface; 125, first protruding portion; 130, second supporting portion; 131, second supporting surface; 132, second positioning groove; 133, second engaging cavity; 134, second protruding portion; 135, first fitting surface; 140, third supporting portion; 141, fourth supporting surface; 150, positioning section; 151, first pocket notch; 1511, bottom surface of first pocket notch; 152, second pocket notch; 1521, bottom surface of the second pocket notch; 160, supporting section; 170, weight-reducing cavity; 200, positioning member; 201, lead-in slope; 202, lead-out slope; 210, connecting portion; 220, first positioning portion; 221, first protruding portion; 230, second positioning portion; 231, second protruding portion; 232, second fitting surface; 300, optical film layer; 301, positioning hole; 310, optical film sheet; 320, diffusion plate; 330, reflective sheet; 331, end of the reflective sheet; 332, inclined portion of the reflective sheet; 340, protruding region; 400, liquid crystal panel; 500, back plate.

An embodiment of the present disclosure provides a display device. As shown in FIG. 1, the display device includes a frame 100, a positioning member 200, and an optical film layer 300.

The optical film layer 300 is provided with a positioning hole 301. The frame 100 is provided with a first supporting surface 121 for supporting the optical film layer 300 and a first positioning groove 122 opened on the first supporting surface 121. The positioning member 200 penetrates through the positioning hole 301 of the optical film layer 300 and is fixed to the first positioning groove 122.

In the display device of the present disclosure, the positioning member 200 penetrates through the positioning hole 301 of the optical film layer 300 and is fixed to the first positioning groove 122, so that the optical film layer 300 is positioned on the frame 100. Such arrangement is stable and reliable, and can ensure that the fixing structure can meet the reliability requirements. There is no need to adopt the auxiliary tape or the like for secondary fixation, which brings convenience in positioning of the optical film 300.

Various components of the display device provided by the embodiments of the present disclosure will be described in detail below with reference to drawings.

As shown in FIG. 1, the display device further includes a liquid crystal panel 400. The frame 100 may also be provided with a second supporting surface 131 for supporting the liquid crystal panel 400. The positioning member 200 includes a first positioning portion 220 fixed in the first positioning groove 122 and a connecting portion 210 connected to the first positioning portion 200. The connecting portion is located between the first supporting surface 121 and the second supporting surface 131. As such, when the positioning member 200 is fixed to the first positioning groove 122, an end of the positioning member 200 away from the first supporting surface 121 is located between the first supporting surface 121 and the second supporting surface 131. Accordingly, the positioning member 200 can realize positioning and fixing of the optical film layer 300, and can avoid scratching the liquid crystal panel 400.

It can be understood that the display device may have the optical film layer 300 and the liquid crystal panel 400 fixed thereon, so the display device may be a liquid crystal display device, such as a bezel-less liquid crystal display device or a liquid crystal display device with a narrow bezel. As shown in FIG. 1, the optical film layer 300 may include, but is not limited to, an optical film sheet 310, a diffusion plate 320, and a reflective sheet 330. The optical film layer 300 may be provided with the positioning hole 301 corresponding to the first positioning grooves 122 so as to be fixed on the frame 100 through the positioning member 200.

In one embodiment, the liquid crystal panel may include a first polarizer, a transparent substrate, a driving array substrate, a liquid crystal layer, a color film layer, and a second polarizer, which are sequentially stacked. The first polarizer is located on a side of the second polarizer close to the optical film layer 300.

Figure 2:
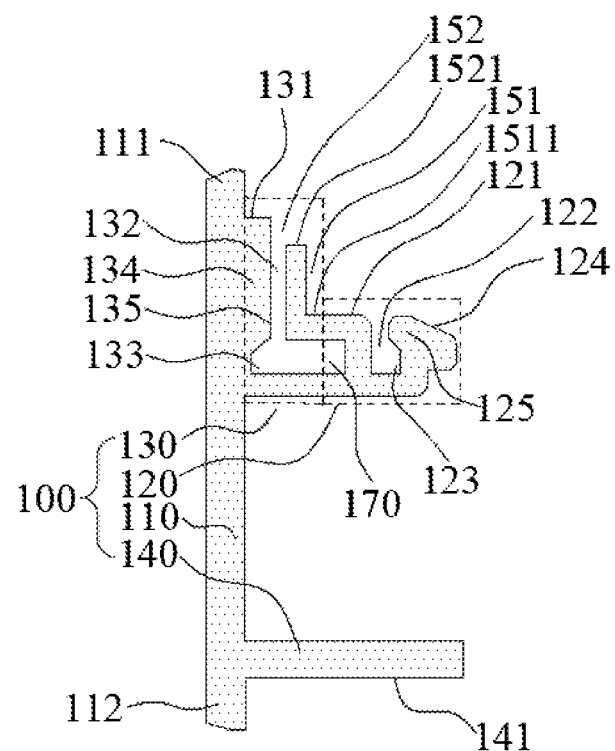
FIG. 2 is a schematic cross-sectional structure diagram of a frame in a positioning section according to an embodiment of the present disclosure.
Figure 3:
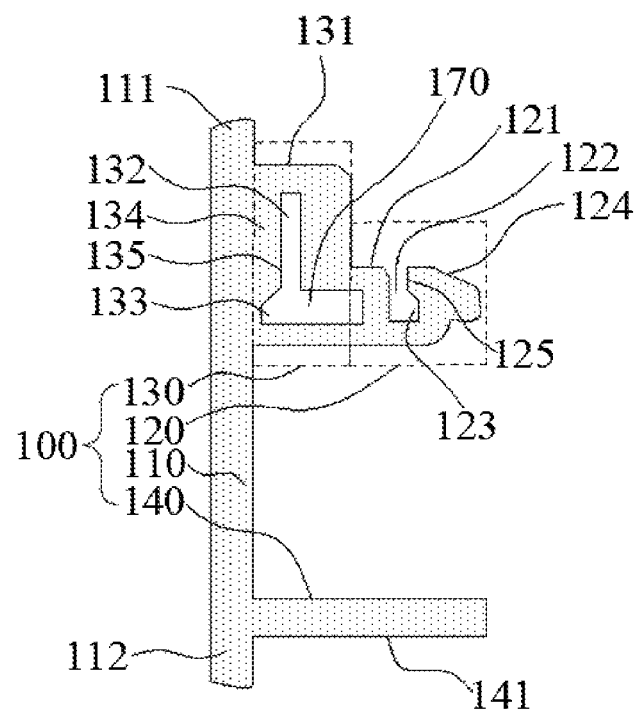
FIG. 3 is a schematic cross-sectional structure diagram of a frame in a supporting section according to an embodiment of the present disclosure.

In one embodiment, as shown in FIGS. 2 and 3, the frame 100 may include a side plate 110, a first supporting portion 120, and a second supporting portion 130. The side plate 110 has an inner side facing the optical film layer 300. The second supporting portion 130 is provided on the inner side of the side plate 110, and the second supporting portion 130 is provided with a second supporting surface 131. The first supporting portion 120 is provided on a side of the second supporting portion 130 away from the side plate 110, and provided with the first supporting surface 121. The first positioning groove 122 is provided in the first supporting portion 120.

Figure 4:
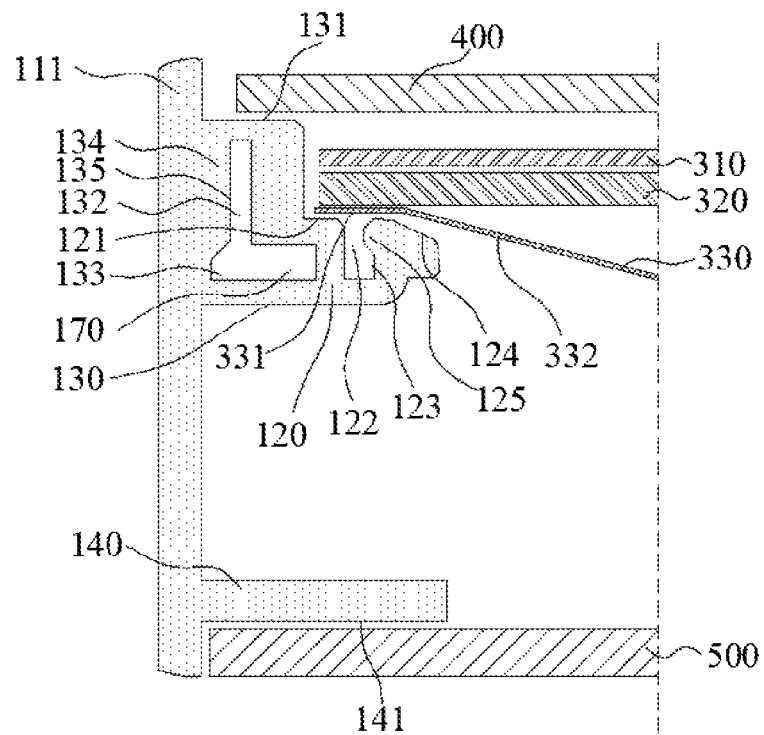
FIG. 4 is a schematic exploded cross-sectional view of a display device in a supporting section according to an embodiment of the present disclosure.

According to an embodiment, as shown in FIGS. 2 and 3, a side of the first supporting portion 120 away from the side plate 110 is provided with a third supporting surface 124. In the direction away from the side plate 100, the third supporting surface 124 extends in the direction away from away from the first supporting surface 121. As shown in FIG. 4, the reflective sheet 330 includes an end 331 and an inclined portion 332. The end 331 of the reflective sheet is supported on the first supporting surface 121, and the inclined portion 332 of the reflective sheet is supported on the third supporting surface 124. As such, effective support for the reflective sheet 330 can be achieved.

According to an embodiment, as shown in FIG. 4, the frame 100 may further include a third supporting portion 140, where a fourth supporting surface 141 is provided on the third supporting portion 140. The fourth supporting surface 141 is disposed on the side of the first supporting surface 121 away from the second supporting surface 131, and is used to support and fix a back plate 500. It can be understood that a light source may be provided on the back plate 500 for providing backlight to the display device. In one embodiment, the side plate 110, the first supporting portion 120, the second supporting portion 130, and the third supporting portion 140 form an integrated structure.

In one embodiment, as shown in FIGS. 2 and 3, on a cross section of the frame 100 perpendicular to its extending direction, the side plate 110 has a first end 111 and a second end 112. The first end 111 is close to the liquid crystal panel 400 of the display device, and the second end 112 is close to the back plate 500 of the display device. The side of the first supporting portion 120 close to the first end 111 of the side plate 110 serves as the first supporting surface 121 for supporting the optical film layer 300. The side of the second supporting portion 130 close to the first end 111 of the side plate 110 serves as the second supporting surface 131 for supporting the liquid crystal panel 400. According to FIGS. 1 and 4, the second supporting surface 131 is located on the side of the first supporting surface 121 close to the first end 111 of the side plate 110. The third supporting portion 140 is provided on the inner side of the side plate 110 and is located on the side of the second supporting portion 130 away from the first end 111 of the side plate 110 and is provided close to the second end 112 of the side plate 110. The side of the third supporting portion 140 away from the first end 111 of the side plate 110 serves as a fourth supporting surface 141 for fixing and supporting the back plate 500.

Figure 5:
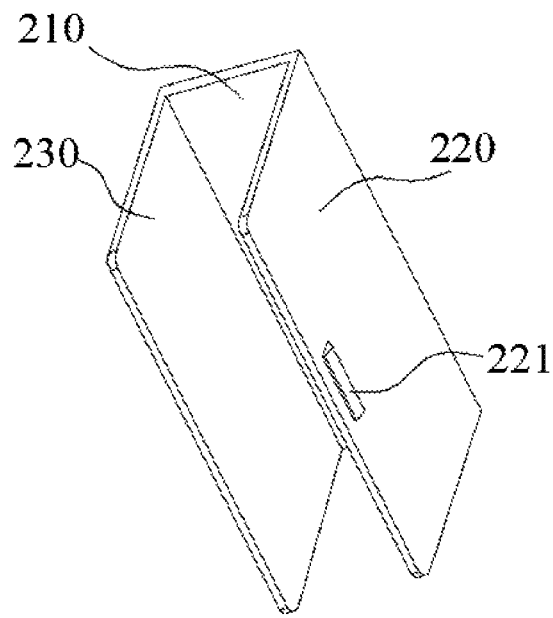
FIG. 5 is a stereogram diagram of a positioning member according to an embodiment of the present disclosure.
Figure 6:
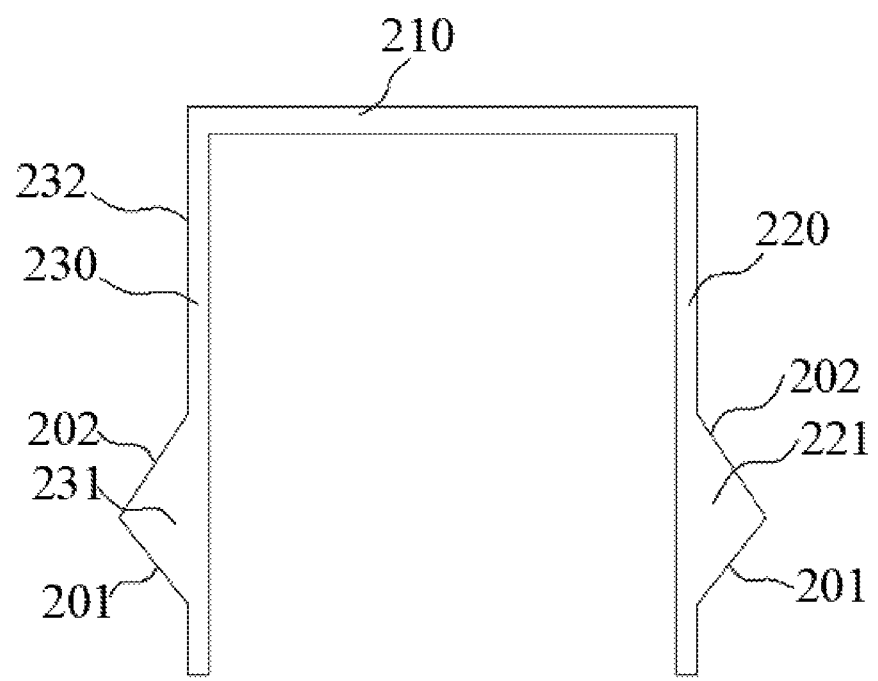
FIG. 6 is a schematic side structure view of a positioning member according to an embodiment of the present disclosure.

As shown in FIG. 2, the frame 100 may also be provided with a second positioning groove 132, and the second positioning groove 132 is provided between the first positioning groove 122 and the side plate 110. As shown in FIGS. 5 and 6, the positioning member 200 may further include a second positioning portion 230. The first positioning portion 220 and the second positioning portion 230 are connected by a connecting part 210. As shown in FIG. 1, the first positioning portion 220 can be fixed to the first positioning groove 122, and the second positioning portion 230 can be fixed to the second positioning groove 132. As such, the positioning member 200 is fixedly connected to the two positioning grooves through the two positioning portions, which improves the stability of the connection between the positioning member 200 and the frame 100 and further improves the stability and reliability of the positioning of the optical film layer 300 in the display device.

In one embodiment, as shown in FIG. 1, the first positioning portion 220 can be detachably fixed to the first positioning groove 122, and the second positioning portion 230 can be detachably fixed to the second positioning groove 132. The positioning member 200 and the frame 100 can be detachably connected to facilitate the installation and removal of the optical film layer 300. For example, the first positioning portion 220 can be clamped into the first positioning groove 122, and the second positioning portion 230 can be clamped into the second positioning groove 132.

According to an embodiment, as shown in FIG. 2, the first positioning groove 122 is provided with a first engaging cavity 123 extending in a direction away from the second positioning groove 132. A portion of the first positioning groove 122 close to the bottom of the groove has a larger size, and a portion of the first positioning groove 122 away from the bottom of the groove has a smaller size. Compared to the first engaging cavity 123, the first supporting portion 120 has a first protruding portion 125 on the side wall of the first positioning groove 122 away from the side plate 110. The first protruding portion 125 protrudes towards the side close to the side plate 110.

As shown in FIG. 2, the second positioning groove 132 is provided with a second engaging cavity 133 extending in a direction away from the first positioning groove 122. A portion of the second positioning groove 132 close to the bottom of the groove has a larger size, and a portion of the second positioning groove 132 away from the bottom of the groove has a smaller size. Compared to the second engaging cavity 133, the second supporting portion 130 has a second protruding portion 134 on the side wall of the second positioning groove 132 close to the side plate 110, and the second protruding portion 134 protrudes towards the side away from the side plate 110. The side surface of the second protruding portion 134 is a first fitting surface 135.

As shown in FIGS. 5 and 6, the first positioning portion 220 is provided with a first protruding portion 221 protruding in a direction away from the second positioning portion 230. The first protruding portion 221 can be accommodated in the first engaging cavity 123. As shown in FIG. 1, when the first positioning portion 220 is fixed in the first positioning groove 122, the first protruding portion 221 is accommodated in the first engaging cavity 123, and the first protruding portion 125 blocks the first protruding portion 221 from going out from the first engaging cavity 123. In one embodiment, the first positioning portion 220 has a plate-like structure provided with a first protruding portion 221.

As shown in FIGS. 5 and 6, the second positioning portion 230 is provided with a second protruding portion 231 protruding in a direction away from the first positioning portion 220. The second protruding portion 231 can be accommodated in the second engaging cavity 133. As shown in FIG. 1, when the second positioning portion 230 is fixed in the second positioning groove 132, the second protruding portion 231 is accommodated in the second engaging cavity 133 and the second protruding portion 134 prevents the second protruding portion from going out from the second engaging cavity 133. In one embodiment, the second positioning portion 230 has a plate-like structure provided with a second protruding portion 231.

According to an embodiment, as shown in FIG. 5 and FIG. 6, the positioning member 200 may be a "⌴" shape, a U shape, or other bent shapes. The two ends of the positioning member 200 are a first positioning portion 220 and a second positioning portion 230, respectively, and the middle portion is the connecting part 210. In one embodiment, as shown in FIG. 6, the second positioning portion 230 has a second fitting surface 232. The second fitting surface 232 is a part of the surface of the second positioning portion 230 close to the side plate 110 and is located between the second protruding portion 231 and the connecting portion 210. As shown in FIG. 1, the second fitting surface 232 is in surface contact connection with the first fitting surface 135 to define the movable range of the positioning member 200 so that the connection of the positioning member 200 and the frame 100 is more reliable.

In one embodiment, the positioning member 200 may have elasticity. For example, the material of the connecting portion 210 may be an elastic material, such as an elastic plastic, an elastic metal, or other elastic materials. The shape of the connecting portion 210 may be a rod shape, a plate shape, or other shapes. When no external force is applied, the positioning member 200 is in its initial state. When subjected to an inward pressure, that is, subjected to an external force that brings the first positioning portion 220 and the second positioning portion 230 closer to each other, the positioning member 200 may be in a compressed state. As the inward pressure disappears or decreases, the first positioning portion 220 and the second positioning portion 230 move away from each other under the elastic force until the initial state is restored. As such, when there is a need to fix the positioning member 200 to the frame 100, an inward pressure can be applied to the positioning member 200, that is, pressing the outer sidewalls of the first positioning portion 220 and the second positioning portion 230, so that the first protruding portion 221 and the second protruding portion 231 are close to each other, and the first positioning portion 220 and the second positioning portion 230 can enter the first positioning groove 122 and the second positioning groove 132, respectively. After the inward pressure is stopped, the first protruding portion 221 and the second protruding portion 231 become away from each other, and then clamped into the first engaging cavity 123 and the second engaging cavity 133, respectively. The first protruding portion 125 prevents the first protruding portion 221 from going out from the first engaging cavity 123, and the second protruding portion 134 prevents the second protruding portion 231 from going out from the second engaging cavity 133, so that the positioning member 200 is fixed to the frame 100. Similarly, when there is a need to remove the positioning member 200, an inward pressure may be applied to the positioning member 200, so that the first protruding portion 221 and the second protruding portion 231 are close to each other and come out from the first engaging cavity 123 and the second engaging cavity 133.

In one embodiment, when the positioning member 200 is in the initial state and the first positioning portion 220 is aligned with the groove opening of the first positioning groove 122, the second positioning portion 230 can be aligned with the groove opening of the second positioning groove 132. As shown in FIG. 6, the side surfaces of the first protruding portion 221 and the second protruding portion 231 away from the connecting portion 210 are lead-in slopes 201. In the direction away from the connecting portion 210, the lead-in slope 201 of the first protruding portion 221 approaches the first positioning portion 220, and the lead-in slope 201 of the second protruding portion 231 approaches the second positioning portion 230. As such, when the first positioning portion 220 is aligned with the groove opening of the first positioning groove 122 and the second positioning portion 230 is aligned with the groove opening of the second positioning groove 132, an external force may be applied to the positioning member 200 to move the positioning member 200 in a direction close to the first positioning groove 122 and the second positioning groove 132. During the movement of the positioning member 200, the lead-in slope 201 is subjected to the force exerted by the groove walls of the first positioning groove 122 and the second positioning groove 132 to make the first positioning portion 220 and the second positioning portion 230 to be close to each other. During the installation of the positioning member 200, there is no need to press the outer sidewalls of the first positioning portion 220 and the second positioning portion 230, which brings convenience in installing the positioning member 200, so that the fixing structure can more easily fix the optical film layer 300.

In another embodiment, as shown in FIG. 6, the side surfaces of the first protruding portion 221 and the second protruding portion 231 close to the connecting portion 210 are lead-out slopes 202. In the direction close to the connecting portion 210, the lead-out slope 202 of the first protruding portion 221 approaches the first positioning portion 220, and the lead-out slope 202 of the second protruding portion 231 approaches the second positioning portion 230. When the first protruding portion 221 is accommodated in the first engaging cavity 123 and the second protruding portion 231 is accommodated in the second engaging cavity 133, an external force may be applied to the positioning member 200 to move the positioning member 200 in a direction away from the first positioning groove 122 and the second positioning groove 132. During the movement of the positioning member 200, the lead-out slope 202 is subjected to the force exerted by the groove walls of the first positioning groove 122 and the second positioning groove 132 to make the first positioning portion 220 and the second positioning portion 230 to be close to each other, so that the positioning member 200 can be smoothly separated from the frame 100. During the installation of the positioning member 200, there is no need to press the outer sidewalls of the first positioning portion 220 and the second positioning portion 230, which brings convenience in removing the positioning member 200, so that the optical film 300 can be more easily removed from the fixed structure.

It should be understood that the above structure of the positioning member is only an exemplary description. In other embodiments of the present disclosure, the positioning member may also have other structures as long as it can play the same role, and will not be described in detail here.

Figure 7:
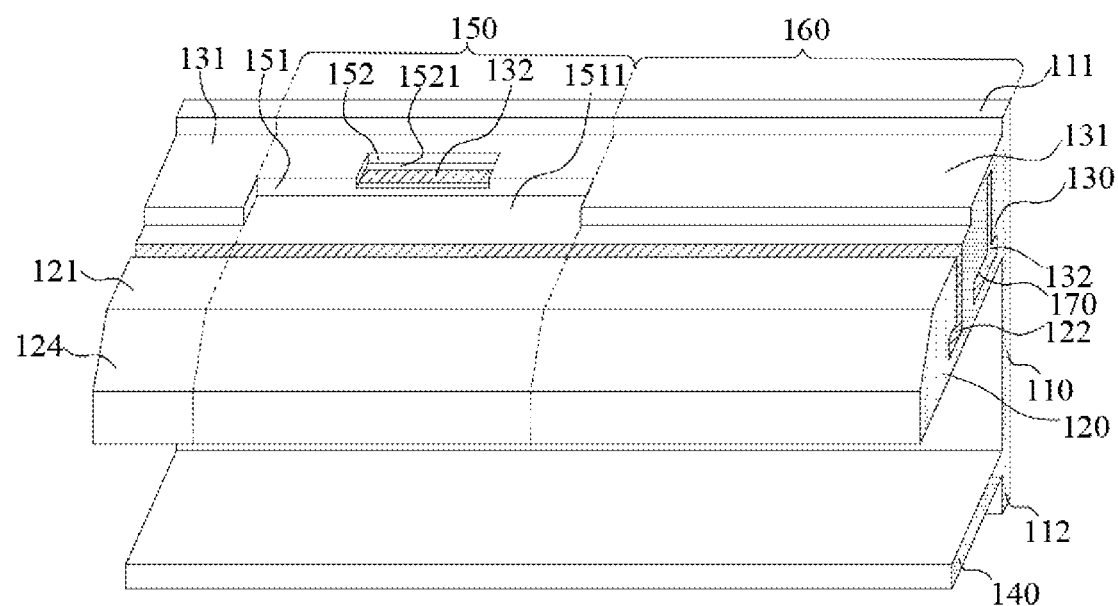
FIG. 7 is a stereogram structural diagram of a frame according to an embodiment of the present disclosure.

As shown in FIG. 7, the frame 100 may include positioning sections 150 and supporting sections 160 spaced apart along its extending direction. The number of positioning sections 150 may be one or more, which is not specifically limited in this disclosure.

As shown in FIG. 7, in any positioning section 150, the second supporting portion 130 may be provided with a first pocket notch 151 opened on the second supporting surface 131. The first pocket notch 151 is also opened on the side of the second supporting portion 130 away from the side plate 110. The first pocket notch 151 is further formed with side walls and a bottom surface 1511 on the second supporting portion 130. The bottom surface 1511 of the first pocket notch is flush with the first supporting surface 121.

Figure 8:
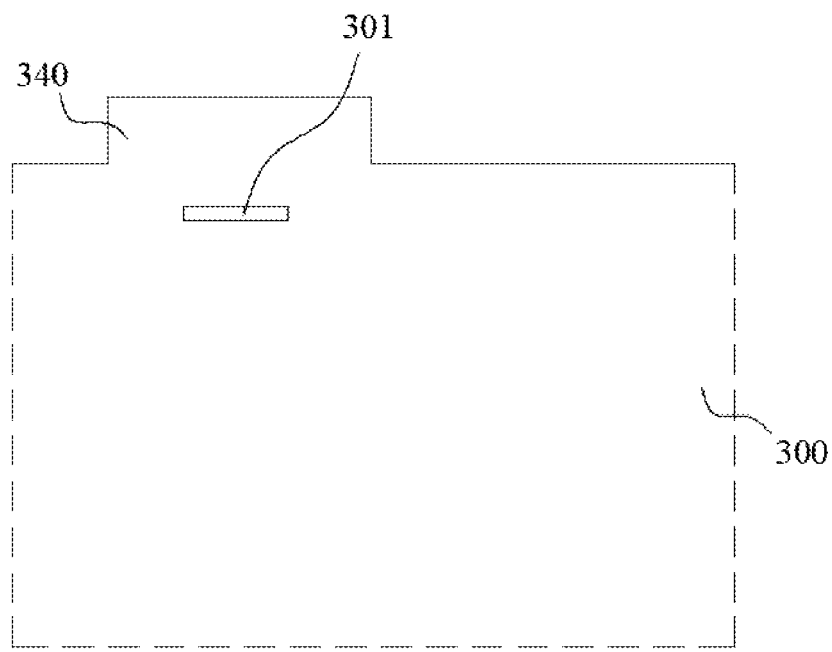
FIG. 8 is a schematic diagram showing a partial structure of an optical film layer according to an embodiment of the present disclosure.
Figure 9:
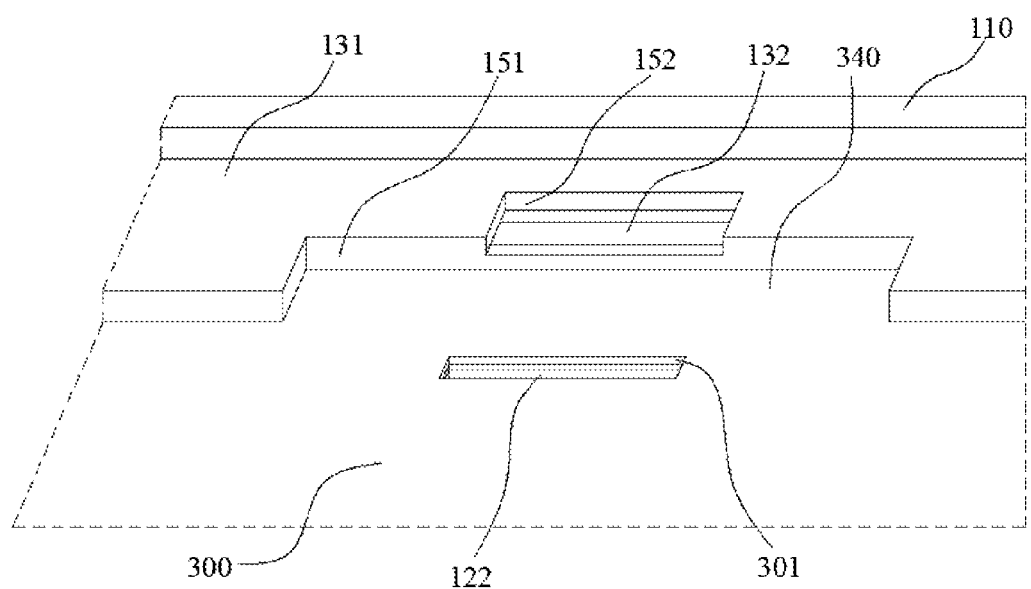
FIG. 9 is a schematic diagram showing fitting of an optical film layer and a frame according to an embodiment of the present disclosure.

Correspondingly, as shown in FIG. 8, the edge of the optical film layer 300 has a protruding region 340 corresponding to the bottom surface 1511 of the first pocket notch. As shown in FIG. 9, the protruding region 340 is accommodated in the first pocket notch 151, the bottom surface 1511 of the first pocket notch can support the protruding region 340 of the optical film layer. The side surfaces of the first pocket notch 151 can define the optical film layer 300. As such, the accuracy of positioning and the stability of the connection between the optical film layer 300 and the frame 100 are improved.

In an embodiment, as shown in FIG. 7, the first positioning groove 122 may be located outside the first pocket notch 151 and is disposed directly opposite to the first pocket notch 151. Correspondingly, the optical film layer 300 needs to be provided with the positioning hole 301 corresponding to the first positioning groove 122. As shown in FIG. 7, at the position of the first pocket notch 151, the optical film layer 300 is supported on a wider size, and the arrangement of the first positioning groove 122 does not seriously reduce the support for the optical film layer 300 by the frame 100. Moreover, since the protruding region 340 is provided between the positioning hole 301 and the outer edge of the optical film layer 300, a larger width and a stronger support capacity can be achieved, which can prevent the optical film layer 300 from being damaged during positioning.

As shown in FIG. 7, in any positioning section 150, the second supporting portion 130 may also be provided with a second pocket notch 152 opened on the second supporting surface 131. The second pocket notch 152 is located between the first pocket notch 151 and the side plate 110, and the second pocket notch 152 is connected to the first pocket notch 151. The second pocket notch 152 opens on the first pocket notch 151 and the second supporting surface 131. The second pocket notch 152 has side walls and a bottom surface 1521. The side walls of the second pocket notch 152 is connected to the second supporting surface 131, and the bottom surface 1521 of the second pocket notch is away from the second supporting surface 131. The second positioning groove 132 is disposed on the second supporting portion 130, and the groove opening of the second positioning groove 132 is located at the bottom surface 1521 of the second pocket notch. The second positioning groove 132 is provided in the second supporting portion 130 to prevent the groove opening of the second positioning groove 132 from occupying the supporting area of the first supporting surface 121 and to ensure that the first supporting surface 121 can effectively support the optical film layer 300. A positioning hole 301 corresponding to the second positioning groove 132 in the optical film layer 300 can be avoided, and thus the number of positioning holes 301 in the optical film layer 300 is reduced, and the strength of the optical film layer 300 is improved. The second pocket notch 152 is used to accommodate one end of the positioning member 200 away from the first positioning groove 122 and the second positioning groove 132, so that the positioning member 200 does not contact the liquid crystal panel 400 supported on the second supporting surface 131, thereby avoiding scratching the liquid crystal panel 400 by the positioning member 200.

In an embodiment, as shown in FIG. 7, along the extending direction of the frame 100, the length of the second pocket notch 152 may be less than or equal to the length of the first pocket notch 151.

In an embodiment, along the extending direction of the frame 100, as shown in FIG. 7, the second positioning groove 132 extends through all the supporting sections 160 and the positioning sections 150. As shown in FIGS. 3 and 7, although the second positioning groove 132 is provided in the supporting section 160, the groove opening of the second positioning groove 132 is occluded by the material of the second supporting portion 130 to avoid poor light leakage of the display device. The second positioning groove 132 penetrates the entire frame, so that the frame can be formed by an extrusion process, which is convenient for the preparation of the entire frame.

In one embodiment, as shown in FIG. 7, along the extending direction of the frame 100, the first positioning groove 122 extends through all the supporting sections 160 and the positioning sections 150. As such, the first positioning groove 122 penetrates the entire frame 100 to facilitate the preparation of the frame 100 through the extrusion process.

In one embodiment, as shown in FIGS. 2, 3 and 7, the frame 100 may further be provided with a weight-reducing cavity 170. The extension direction of the weight-reducing cavity is the same as the extension direction of the frame 100 and communicates with the second positioning groove 132. The weight-reducing cavity 170 can reduce the weight of the frame 100 to facilitate the weight reduction of the display device; the weight-reducing cavity 170 can also reduce the material consumption of the frame 100, thereby reducing the material cost of the frame.

The present disclosure also provides a frame for a display device, which is applied to any display device described in the above embodiments of the display device. As shown in FIGS. 2 and 3, the frame 100 is provided with a first supporting surface 121 for supporting the optical film layer 300 and a first positioning groove 122 opened on the first supporting surface 121. As such, the frame 100 can fit with the corresponding positioning member 200 and the optical film layer 300 to achieve stable and reliable fixing of the optical film layer 300.

According to an embodiment, as shown in FIGS. 2 and 3, the frame 100 may also be provided with a second supporting surface 131 for supporting the liquid crystal panel 400.

In an embodiment, as shown in FIGS. 2 and 3, the frame 100 may include a side plate 110, a second supporting portion 130 and a first supporting portion 120. The side plate 110 has an inner side facing the optical film layer 300; the second supporting portion 130 is provided on the inner side. The second supporting portion 130 is provided with a second supporting surface 131 for supporting the liquid crystal panel 400; the first supporting portion 120 is provided on the side of the second supporting portion 130 away from the side plate 110; the first supporting portion 120 is provided with a first supporting surface 121 for supporting the optical film layer 300; the first supporting portion 120 is further provided with a first positioning groove 122 opened on the first supporting surface 121.

In an embodiment, as shown in FIG. 2, the frame 100 may further be provided with a second positioning groove 132, and the second positioning groove 132 is disposed between the first positioning groove 122 and the side plate 110. According to an embodiment, the first positioning slot 122 is provided with a first engaging cavity 123 extending in a direction away from the second positioning slot 132; the second positioning slot 132 is provided with a second engaging cavity 133 extending in a direction away from the first positioning slot 132.

In one embodiment, as shown in FIG. 2, the side of the first supporting portion 120 away from the side plate 110 is provided with a third supporting surface 124; in the direction away from the side plate 110, the third supporting surface 124 extends in the direction away from the first supporting surface 121. The third supporting surface 124 is used to support the inclined portion of the reflective sheet 330.

In an embodiment, as shown in FIG. 7, the frame 100 may include positioning sections 150 and supporting sections 160 spaced apart along its extending direction. The number of positioning sections 150 may be one or multiple, which is not specifically limited in this disclosure.

As shown in FIG. 7, in any positioning section 150, the second supporting portion 130 may be provided with a first pocket notch 151 opened on the second supporting surface 131; the first pocket notch 151 is also opened on the side of the second supporting portion 130 away from the side plate 110. The first pocket notch 151 is further formed with side walls and a bottom surface 1511 on the second supporting portion 130. The bottom face 1511 of the first pocket notch is flush with the first supporting surface 121.

Further, as shown in FIG. 7, in any positioning section 150, the second supporting portion 130 may also be provided with a second pocket notch 152 opened on the second supporting surface 131; the second pocket notch 152 is located between the first pocket notch 151 and the side plate 110, and the second pocket notch 152 is connected to the first pocket notch 151. As such, the second pocket notch 152 is opened on the first pocket notch 151 and the second supporting surface 131. The second pocket notch 152 has side walls and a bottom surface 1521. The side walls of the second pocket notch 152 is connected to the second supporting surface 131, and the bottom surface 1521 of the second pocket notch is away from the second supporting surface 131. The second positioning groove 132 is disposed on the second supporting portion 130, and the groove opening of the second positioning groove 132 is located at the bottom surface 1521 of the second pocket notch.

Furthermore, as shown in FIG. 7, along the extending direction of the frame 100, the second positioning groove 132 extends through all the supporting sections 160 and the positioning sections 150. As shown in FIGS. 3 and 7, although the second positioning groove 132 is provided in the supporting section 160, the groove opening of the second positioning groove 132 is occluded by the material of the second supporting portion 130.

According to an embodiment, as shown in FIG. 7, along the extending direction of the frame 100, the first positioning groove 122 extends through all the supporting sections 160 and the positioning sections 150. As such, the first positioning groove 122 penetrates the entire frame 100 to facilitate the preparation of the frame 100 through the extrusion process.

According to an embodiment, as shown in FIG. 7, the frame 100 may further be provided with a weight-reducing cavity. The extension direction of the weight-reducing cavity is the same as the extension direction of the frame 100 and the weight-reducing cavity communicates with the second positioning groove 132.

The specific principles, uses, and effects of the frame for the display device provided by the present disclosure have been described in detail in the above-mentioned embodiments of the display device, and will not be repeated here.

It should be understood that the present disclosure is not limited to the detailed structure and arrangement of the components proposed by the present specification. The present disclosure can be carried out and implemented in various manners. Variations and modifications fall within the scope of the present disclosure. It should be understood that the present disclosure extends to all alternative combinations of two or more of the individual features mentioned herein and/or in the drawings. All of these various combinations constitute a number of alternative aspects of the present disclosure. The embodiments described in the present specification are illustrative of the best mode for carrying out the invention and will enable those skilled in the art to utilize the present disclosure.

What is claimed is:

1. A display device, comprising:
   a liquid crystal panel;
   an optical film layer having a positioning hole;
   a frame having a first supporting surface for supporting the optical film layer and a first positioning groove opened on the first supporting surface, wherein:
      the frame is further provided with a second supporting surface for supporting the liquid crystal panel; and
      the frame comprises:
         a side plate having an inner side facing the optical film layer;
         a second positioning groove located between the first positioning groove and the side plate, the first positioning groove being provided with a first engaging cavity extending in a direction away from the second positioning groove, and the second positioning groove being provided with a second engaging cavity extending in a direction away from the first positioning groove;
a second supporting portion provided on the inner side and having the second supporting surface; and
a first supporting portion provided on a side of the second supporting portion away from the side plate, and having the first supporting surface and the first positioning groove; and
a positioning member penetrating through the positioning hole and fixed to the first positioning groove.

2. The display device according to claim 1, wherein:
the positioning member comprises a first positioning portion fixed in the first positioning groove and a connecting portion connected to the first positioning portion; and
the connecting portion is located between the first supporting surface and the second supporting surface.

3. The display device according to claim 2, wherein:
the positioning member further comprises a second positioning portion;
the second positioning portion and the first positioning portion are connected by the connecting portion;
a material of the connecting portion is an elastic material; and
the first positioning portion is clamped into the first positioning groove and the second positioning portion is clamped into the second positioning groove.

4. The display device according to claim 3, wherein:
the first positioning portion is provided with a first protruding portion protruding in a direction away from the second positioning portion;
the first protruding portion is accommodated in the first engaging cavity;
the second positioning portion is provided with a second protruding portion protruding in a direction away from the first positioning portion; and
the second protruding portion is accommodated in the second engaging cavity.

5. The display device according to claim 3, wherein a surface of the second positioning portion close to the side plate is in contact with and connected to a surface of the second positioning groove close to the side plate.

6. The display device according to claim 1, wherein:
a side of the first supporting portion away from the side plate is provided with a third supporting surface;
in a direction away from the side plate, the third supporting surface extends in a direction away from the first supporting surface;
the optical film layer comprises a reflective sheet which comprises an end and an inclined portion;
the end of the reflective sheet is supported on the first supporting surface; and
the inclined portion of the reflective sheet is supported on the third supporting surface.

7. The display device according to claim 1, wherein:
the frame comprises positioning sections and supporting sections spaced apart along an extending direction;
in any of the positioning sections, the second supporting portion is provided with a first notch opened on the second supporting surface;
the first notch is also opened on a side of the second supporting portion away from the side plate; and
the first notch has a bottom surface flush with the first supporting surface.

8. The display device according to claim 7, wherein:
in any one of the positioning sections, the second supporting portion is further provided with a second notch opened on the second supporting surface, the second notch being located between the first notch and the side plate;
the second notch is connected to the first notch;
the second notch has a bottom surface away from the second supporting surface;
the second positioning groove is provided on the second supporting portion; and
a groove opening of the second positioning groove is located at the bottom surface of the second notch.

9. The display device according to claim 8, wherein, along the extending direction of the frame, the second positioning groove extends through all the supporting sections.

10. The display device according to claim 9, wherein the frame is further provided with a weight-reducing cavity, and an extension direction of the weight-reducing cavity is the same as the extension direction of the frame, and the weight-reducing cavity is in communication with the second positioning groove.

11. The display device according to claim 1, wherein, along the extending direction of the frame, the first positioning groove extends through the frame.

12. The display device according to claim 7, wherein an edge of the optical film layer has a protruding region corresponding to the bottom surface of the first notch, and the first notch is configured to accommodate the protruding region.

13. The display device according to claim 8, wherein the second notch is configured to accommodate an end of the positioning member away from the first positioning groove and the second positioning groove.

14. The display device according to claim 3, wherein:
the frame comprises positioning sections and supporting sections spaced apart along an extending direction;
in any of the positioning sections, the second supporting portion is provided with a first notch opened on the second supporting surface;
the first notch is also opened on a side of the second supporting portion away from the side plate; and
the first notch has a bottom surface flush with the first supporting surface.

15. The display device according to claim 4, wherein:
the frame comprises positioning sections and supporting sections spaced apart along an extending direction;
in any of the positioning sections, the second supporting portion is provided with a first notch opened on the second supporting surface;
the first notch is also opened on a side of the second supporting portion away from the side plate; and
the first notch has a bottom surface flush with the first supporting surface.

16. The display device according to claim 5, wherein:
the frame comprises positioning sections and supporting sections spaced apart along an extending direction;
in any of the positioning sections, the second supporting portion is provided with a first notch opened on the second supporting surface;
the first notch is also opened on a side of the second supporting portion away from the side plate; and
the first notch has a bottom surface flush with the first supporting surface.

17. The display device according to claim 6, wherein:
the frame comprises positioning sections and supporting sections spaced apart along an extending direction;

in any of the positioning sections, the second supporting portion is provided with a first notch opened on the second supporting surface;

the first notch is also opened on a side of the second supporting portion away from the side plate; and the first notch has a bottom surface flush with the first supporting surface.

18. A frame for a display device, comprising:

a side plate having an inner side facing an optical film layer;

a second supporting portion provided on the inner side and provided with a second supporting surface for supporting a liquid crystal panel;

a first supporting portion provided on a side of the second supporting portion away from the side plate, and provided with a first supporting surface for supporting the optical film layer, wherein the first supporting portion is further provided with a first positioning groove opened on the first supporting surface; and a second positioning groove located between the first positioning groove and the side plate, wherein the first positioning groove is provided with a first engaging cavity extending in a direction away from the second positioning groove, and the second positioning groove is provided with a second engaging cavity extending in a direction away from the first positioning groove.

19. The frame for the display device according to claim 18, wherein:

the frame comprises positioning sections and supporting sections spaced apart along an extending direction;

in any of the positioning sections, the second supporting portion is provided with a first notch opened on the second supporting surface;

the first notch is also opened on a side of the second supporting portion away from the side plate, and the first notch has a bottom surface flush with the first supporting surface;

in any one of the positioning sections, the second supporting portion is further provided with a second notch opened on the second supporting surface, the second notch being located between the first notch and the side plate;

the second notch is connected to the first notch, and the second notch has a bottom surface away from the second supporting surface;

the second supporting portion is provided with a second positioning groove;

a groove opening of the second positioning groove is located at a bottom surface of the second notch; and along the extending direction of the frame, the second positioning groove extends through all the supporting sections.

* * * * *